Oct. 20, 1953 R. O. GRAY ET AL 2,656,408

SUBSCRIBER SIGNALING SYSTEM

Original Filed July 2, 1948 2 Sheets-Sheet 1

RICHARD O. GRAY
ERWIN M. ROSCHKE
*INVENTORS*

BY [signature]

*THEIR AGENT*

RICHARD O. GRAY
ERWIN M. ROSCHKE
*INVENTORS*

*BY* Bruce L. Birchard
*THEIR AGENT*

Patented Oct. 20, 1953 2,656,408

UNITED STATES PATENT OFFICE 2,656,408

SUBSCRIBER SIGNALING SYSTEM

Richard O. Gray and Erwin M. Roschke, Broadview, Ill., assignors to Zenith Radio Corporation, a corporation of Illinois Original application July 2, 1948, Serial No. 36,778. Divided and this application May 21, 1949, Serial No. 94,643

17 Claims. (Cl. 178—5.1)

This invention relates to radio signalling systems, and more particularly to such systems of the subscriber type.

This application is a division of copending application Serial No. 36,778, filed July 2, 1948, in the names of Richard O. Gray and Erwin M. Roschke, entitled "Subscriber Signalling Systems" and assigned to the present assignee.

It is an object of this invention to provide a subscription transmitting system in which a transmitted signal is coded by means of a coding signal having a certain characteristic, and in which the characteristic of the coding signal is altered from time to time.

It is a further object of this invention to provide such a system wherein key signals are transmitted to subscriber receiver systems to indicate the times of occurrence of such changes in characteristics in the above coding signal.

Yet another object of this invention is to provide such a system wherein such key signals are transmitted to subscriber receiver systems by means of some private link, such as a telephone line, power line and the like, between transmitter and receiver.

A still further object of this invention is to provide such a system, in which the above mentioned coding signal is transmitted concomitantly with the transmitted coded signals to be utilized in subscriber receiving systems for decoding the coded signals.

It is an additional object of this invention to provide a subscription television transmitter wherein mode changes are effected at a rate faster than the recurrence rate of the scanning fields.

A more particular object of this invention is to provide a television system in which a coding signal is utilized for coding a transmitted television signal, and wherein the coding signal is transmitted to subscriber receiver systems modulated preferably on the audio carrier portion of the television signal.

Yet another particular object of this invention is to provide means in such a television system for changing the characteristics of the coding signal from time to time, and for transmitting key signals to indicate the times of occurrence of such changes, these key signals being transmitted to subscriber receiver systems by way of power lines, phone lines, or the like.

The features of this invention, which are believed to be new, are set forth with particularity in the appended claims. The invention itself, however, together with further objects and advantages thereof may best be understood by reference to the following description when taken in conjunction with the accompanying drawings, in which:

Figure 1:
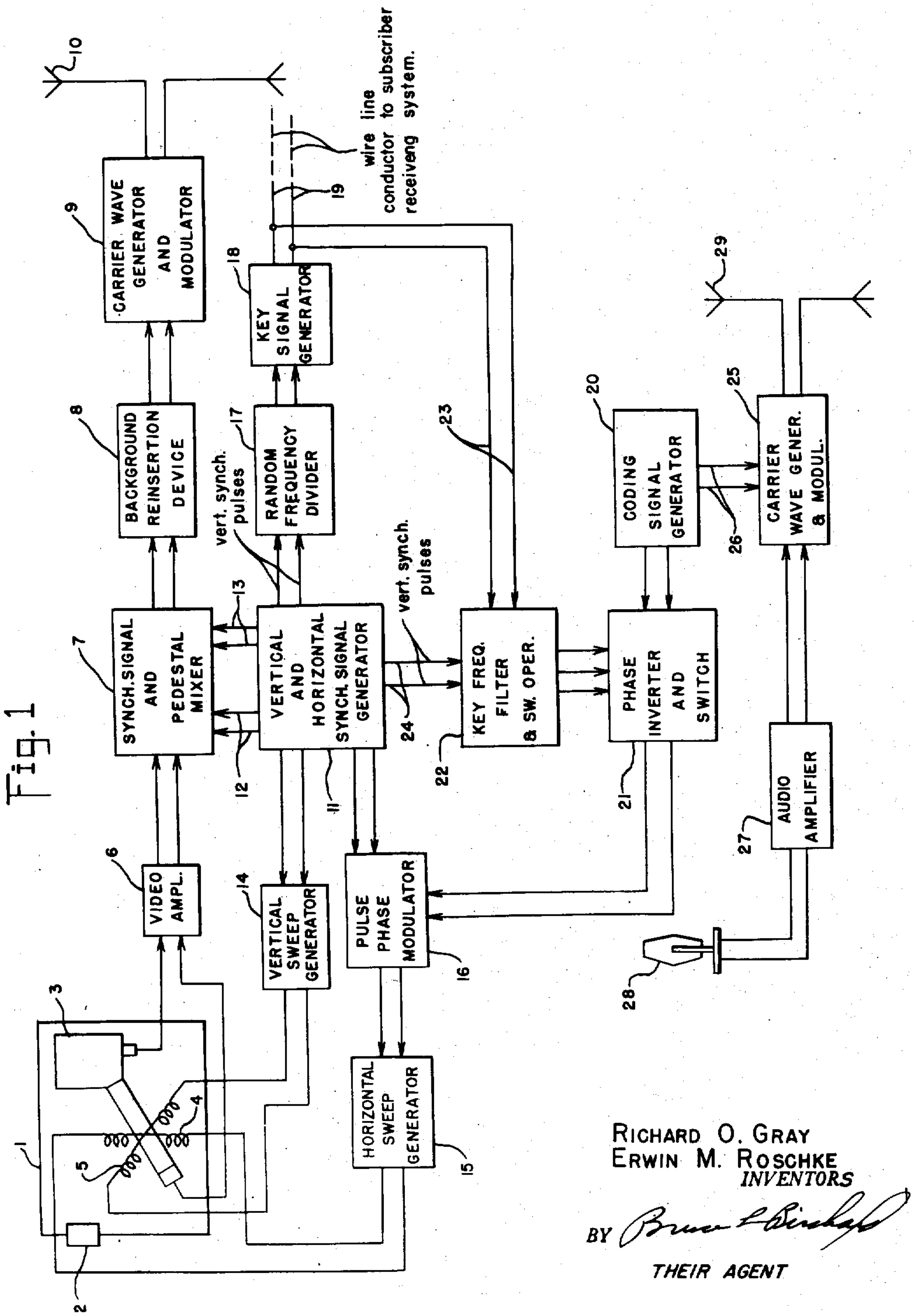
Figure 1 shows a television transmitter system incorporating the invention.
Figure 2:
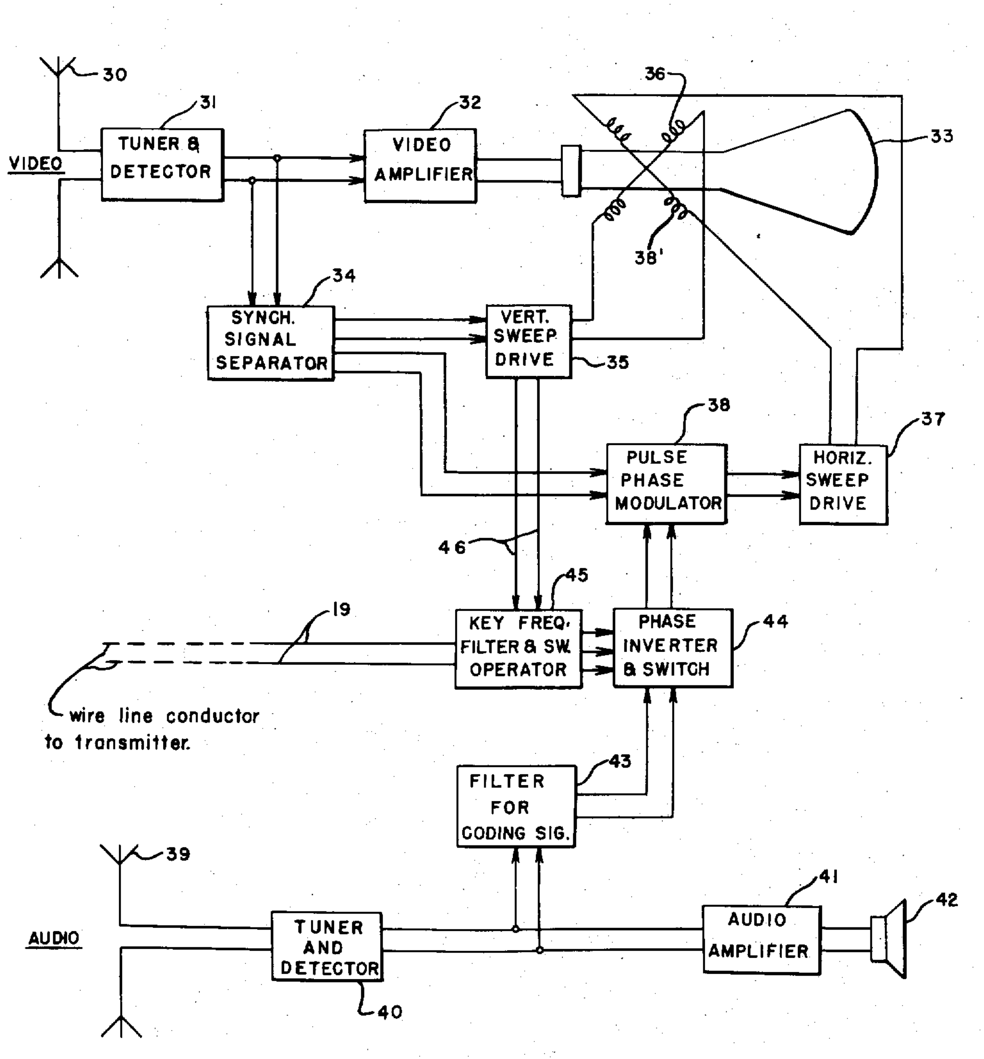
Figure 2 shows a receiver system operating in conjunction with the transmitter of Figure 1.

The various components that constitute the systems of Figure 1 and Figure 2 are in themselves either quite conventional, or have been previously described in copending application Serial No. 742,374, entitled "Radio Wire Signalling System," Ellett et al., filed April 18, 1947, and assigned to the present assignee and issued as Patent 2,510,046 on May 30, 1950; or in copending application Serial No. 773,848, entitled "Subscription Image Transmission System and Apparatus," Roschke, filed September 13, 1947, also assigned to the present assignee and issued as Patent 2,547,598 on April 3, 1951. These components are therefore shown in block form, and a detailed description thereof is believed to be unnecessary.

Referring now to Figure 1, the television transmitter shown herein includes a usual camera 1. Camera 1 comprises a conventional lens system 2 for focusing images upon the screen of television pick-up tube 3, pick-up tube 3 being of the iconoscope or image orthicon type, and including a horizontal scanning coil 4 and vertical scanning coil 5. Video signals from tube 3 are amplified in video amplifier stages 6, and synchronizing signals and blanking pedestals are mixed with these video signals in synchronizing signal and pedestal mixer stage 7. Signals from stage 7 are impressed on background reinsertion device 8, and the resulting program signals, appropriately adjusted as to background level, are modulated on the video carrier in carrier wave generator and modulator stage 9, and thence radiated from antenna 10. Vertical and horizontal synchronizing signals are generated in vertical and horizontal synchronizing signal generators 11, and these signals are applied to stage 7 by way of leads 12 and 13 respectively. Vertical synchronizing signals from stage 11 are further impressed on vertical sweep generator 14, the output of which is coupled to the vertical scanning coil 5 of tube 3. Similiarly, horizontal synchronizing signals from stage 11 are further impressed on horizontal sweep generator 15 through a conventional pulse phase modulator 16. Reference is made to page 478 of "Wave Forms," MIT Radiation Lab. series, volume 19, McGraw- Hill, 1949, for a detailed description of a pulse phase modulator suitable for use in the present system. The modulator 16 is controlled, in a manner to be described, to alter the horizontal sweep of pick-up tube 3, the output of sweep generator 15 being applied to the horizontal sweep coil 4 of this tube. That is, assuming that a sine-wave signal is applied to modulator 16, the synchronizing pulses applied to sweep generator 15 are time- or phase-modulated in accordance with the sine wave. This causes the timing of the horizontal sweep of tube 3 to vary in a continuous, cyclical fashion relative to the horizontal synchronizing signals developed by generator 11. Therefore, the timing of the video signal generated by tube 3 varies in a similar fashion relative to the horizontal synchronizing signals applied to mixer 7 from generator 11. In this manner the radiated program signals are effectively coded since the video portion thereof does not have a fixed time relation with respect to the horizontal synchronizing signal portion, but has a timing that varies in accordance with the sine wave applied to modulator 16. Although modulator 16 is shown as being included in the horizontal sweep circuit, such a modulator may similarly be included in the vertical sweep circuit, as will become apparent as the present description proceeds.

Vertical synchronizing pulses from generator 11 are further impressed on random frequency divider 17, and random frequency divided pulses from divider 17 are utilized to trigger key signal generator 18, a burst of key signal being obtained on leads 19 in response to each of these random frequency divided pulses. The key signal generator may be of the type disclosed in aforementioned Patent 2,547,598 and described in detail therein in conjunction with Figure 12. Frequency divider 17 need not necessarily be of the random type, and may be any known frequency divider circuit. For example, the frequency divider may be of the type disclosed in aforementioned Patent 2,547,598 and fully discussed therein with reference to Figure 11. However, when it is desired that the frequency division of the pulses in divider 17 be of a random nature, the circuit of this divider may have a form similiar to that disclosed in copending application Serial No. 32,457, entitled "Random Frequency Divider," Erwin M. Roschke, filed June 11, 1948, issued March 11, 1952, as Patent 2,588,413, and assigned to the present assignee.

Leads 19 connect the transmitter with subscriber receiving systems, and these leads may conveniently be some form of wire line conductor such as power lines, phone lines, and the like, or these leads may be a coaxial cable, or when so desired, the key signals may be radiated on suitable carriers to the subscriber receivers. The frequency of the key signals is usually made such that it does not interfere with signals normally carried by the leads 19; however, the key signals may be transmitted to subscriber receivers in any suitable form such as pulses, or the like, the sole function of these key signals being to indicate to subscriber receivers the times when certain changes occur in the coding of the transmitted signal.

The pulse phase modulator 16 is controlled by coding signal generator 20, signals from generator 20 being impressed on this modulator through phase inverter and switch 21. Signal generator 20 may take the form of any well-known vacuum-tube oscillator, and unit 21 may be of the type disclosed in aforementioned Patent 2,510,046 and described in detail therein in conjunction with Figure 6. Phase inverter and switch 21 is utilized to change the characteristics of the coding signal impressed on modulator 16, which changes occur at various time intervals. In the illustrated embodiment, stage 21 acts to invert the phase of this coding signal in response to actuation of key frequency filter and switch operator 22. Stage 22 has previously been described in detail in aforementioned Patent 2,547,598 in conjunction with Figure 14 thereof. Bursts of key signal from leads 19 are impressed on stage 22 by way of leads 23, and in response to each burst of key signal, the next succeeding vertical synchronizing pulse on leads 24 connecting generator 11 to stage 22, acts to cause stage 21 to invert the phase of signals passing therethrough, and upon the termination of each burst of key signal, the next succeeding vertical synchronizing pulse on leads 24 acts to reverse this action.

Signals from generator 20 may take on any desired form such as pulses, saw tooth waves, sine waves, and the like and to add to the coding characteristics of these coding signals, they may be phase or frequency modulated by any suitable means, when so desired. The signals from generator 20 preferably are modulated on the audio carrier in carrier wave generator and modulator stage 25, this modulation being effected in any desired fashion, and these signals being impressed on stage 25 by way of leads 26. The audio signals accompanying the above described video signals are impressed on audio amplifier stage 27 from a usual microphone or translating device 28, the amplified audio signals are modulated on the audio carrier in stage 25 together with the coding signal, and the modulated audio carrier is radiated by antenna 29.

Hence, it can be seen that the transmitted television signal is coded by means of a coding signal from generator 20, which coding signal is transmitted on the audio carrier. It can further be seen that the coding signal is phase inverted from time to time, the times of such phase inversion being indicated to subscriber receiver systems by the key signals over private link 19, so that corrective circuits may be actuated thereby in these receivers. It is apparent that stage 21 need not necessarily be a phase inverter stage, as any suitable change may be imparted to the characteristic of the coding signal, so long as a similiar corrective change is effected at the subscriber receiver at proper intervals.

Such a subscriber receiver is shown in Figure 2. Referring now to Figure 2, video signals are received on antenna 30, these signals being tuned and detected in tuner and detector stages 31. A detected video signal from stage 31 is amplified in video amplifier stage 32, and amplified signals from stage 32 are impressed on receiver image tube 33 in the usual manner. Synchronizing signals are removed from the detected signal by means of synchronizing signal separator stage 34, and vertical synchronizing signals derived from this stage are applied to vertical sweep drive 35 to actuate this drive, drive 35 in turn providing scanning potentials to vertical sweep coil 36 of tube 33. Horizontal synchronizing signals from separator 34 are applied to horizontal sweep drive 37 through pulse phase modulator 38, which modulator is similar to modulator 16 of Figure 1. The output of horizontal sweep drive 37 is impressed on horizontal sweep coil 38' of tube 33.

Audio signals accompanying the previously described video signals are received on antenna 39, and such signals are tuned and detected in tuner and detector stage 40. A tuned and detected signal is amplified in audio amplifier 41, and reproduced in signal translating device 42. The previously described coding signal is removed from the audio carrier by filter stage 43, and this coding signal is impressed on pulse modulator 38 through phase inverter and switch 44, this phase inverter and switch being similar to switch 21 of Figure 1.

In the absence of key signals on conductors 19, phase inverter and switch 44 passes the coding signal from filter 43 to modulator 38 in a non-inverted manner, and the horizontal sweep of the receiver image tube is changed to correct changes in the timing of the video signal components relative to the horizontal synchronizing signal components of the received television signal, and tube 33 therefore reproduces the received video signal. However, as previously stated the phase of the coding signal as applied to modulator 16 is inverted at the transmitter from time to time, such changes being indicated by the presence of key signals on conductors 19. Upon the receipt of such key signals, key frequency filter and switch operator 45, in response to the next succeeding vertical blanking pulse on leads 46 from vertical sweep drive 35, operates stage 44 to invert the phase of the received coding signal as applied to modulator 38 in correspondence to such inversion at the transmitter, so that tube 33 continues to reproduce the received video signal.

While a particular embodiment of the invention has been shown and described, modifications may be made without departing therefrom. The appended claims are intended to cover any such modifications as fall within the true spirit and scope of the invention.

We claim:

1. A subscription transmitter system comprising: apparatus for producing electrical signals representing intelligence to be transmitted by said system; coding means coupled to said apparatus for coding said electrical signals in response to an applied coding signal; means coupled to said apparatus for transmitting said coded electrical signals to a point remote from said transmitter; a first coding-signal source for supplying a first coding signal to said coding means to code said electrical signals in accordance with a certain coding schedule determined by a characteristic of said first coding signal; a source of a second coding signal different from said first coding signal; apparatus coupled to both of said coding signal sources and to said coding means for altering at least during spaced time intervals said characteristic of said first coding signal thereby to vary said coding schedule in accordance with said second coding signal; means coupled to said first coding-signal source for transmitting a first key signal over one channel; and means coupled to said second coding-signal source for transmitting a second key signal over another channel.

2. A subscription transmitter system comprising: apparatus for producing electrical signals representing intelligence to be transmitted by said system; coding means coupled to said apparatus for coding said electrical signals in response to an applied coding signal; means coupled to said apparatus for transmitting said coded electrical signals to a point remote from said transmitter; a first coding-signal source for supplying a first coding signal to said coding means to code said electrical signals in accordance with a certain coding schedule determined by a characteristic of said first coding signal; a source of a second coding signal different from said first coding signal; apparatus coupled to said second coding-signal source and disposed between said first coding signal source and said coding means for alterning at least during spaced time intervals said characteristic of said first coding signal as applied to said coding means thereby to vary said coding schedule in accordance with said second coding signal; means coupled to said first coding-signal source for transmitting a first key signal over one channel; and means coupled to said second coding-signal source for transmitting a second key signal over another channel.

3. A subscription transmitter system comprising: apparatus for producing electrical signals representing intelligence to be transmitted by said system; coding means coupled to said apparatus for coding said electrical signals in response to an applied coding signal; means coupled to said apparatus for transmitting said coded electrical signals to a point remote from said transmitter; a first coding-signal source for supplying a coding signal to said first coding means to code said electrical signals in accordance with a certain coding schedule determined by said first coding signal; a source of a second coding signal different from said first coding signal; apparatus coupled to said second coding-signal source and disposed between said first coding-signal source and said coding means for inverting during spaced time intervals the phase of said first coding signal as applied to said coding means thereby to vary said coding schedule in accordance with said second coding signal; means coupled to said first coding-signal source for transmitting a first key signal over one channel; and means coupled to said second coding-signal source for transmitting a second key signal over another channel.

4. A subscription transmitter system comprising: apparatus for producing electrical signals representing intelligence to be transmitted by said system; coding means coupled to said apparatus for coding said electrical signals in response to an applied coding signal; means coupled to said apparatus for transmitting said coded electrical signals to a point remote from said transmitter; a first coding-signal source for supplying a first coding signal to said coding means to code said electrical signals in accordance with a certain coding schedule determined by a characteristic of said first coding signal; apparatus disposed between said first coding-signal source and said coding means and responsive to an applied signal for alterning said characteristic of said first coding signal as applied to said coding means thereby to vary said coding schedule; a key-signal source for supplying a key signal to said last-mentioned apparatus to effect said alteration in said characteristic of said first coding signal during spaced time intervals determined by said key signal; means coupled to said first coding-signal source for transmitting a first decoding signal over one channel; and means coupled to said key-signal source for transmitting said key signal over another channel.

5. A subscription transmitter system comprising: apparatus for producing electrical signals representing intelligence to be transmitted by said system; coding means coupled to said apparatus for coding said electrical signals in response to an applied coding signal; means coupled to said apparatus for transmitting said coded electrical signals to a point remote from said transmitter; a first coding-signal source for supplying a first coding signal to said coding means to code said electrical signal in accordance with a certain coding schedule determined by a characteristic of said first coding signal; apparatus disposed between said first coding signal source and said coding means and responsive to an applied signal for altering said characteristic of said first coding signal as applied to said coding means thereby to vary said coding schedule; a key-signal source coupled to said last-mentioned apparatus for producing a key signal to effect said alteration in said characteristic of said first coding signal during spaced time intervals determined by said key signal; means coupled to said first coding-signal source for transmitting a first decoding signal to said remote point and a line circuit coupled to said key-signal source for transmitting said key signal to said remote point.

6. A subscription transmitter system comprising: apparatus for producing electrical signals representing intelligence to be transmitted by said system; coding means coupled to said apparatus for coding said electrical signals in response to an applied coding signal; means coupled to said apparatus for transmitting said coded electrical signals to a point remote from said transmitter; a first coding-signal source coupled to said coding means for producing a first coding signal to effect said coding of said electrical signals in accordance with a certain coding schedule determined by a characteristic of said first coding signal, means for applying said first coding signal to said transmission means for transmission to said remote point concurrently with the transmission of said coded electrical signals; apparatus disposed between said first coding-signal source and said coding means and responsive to an applied signal for altering said characteristic of said first coding signal as applied to said coding means thereby to vary said coding schedule; a key-signal source coupled to said last-mentioned apparatus for producing a key signal to effect said alteration in said characteristic of said first coding signal during spaced time intervals determined by said key signal; and means coupled to said key-signal source for transmitting said key signal separately from said coded signals and said first coding signal to said remote point.

7. A subscription television transmitter system comprising: apparatus for producing a television signal representing image intelligence to be transmitted by said system and for producing an audio signal representing sound intelligence to be transmitted by said system; coding means coupled to said apparatus for coding at least one of said signals in response to an applied coding signal; means coupled to said apparatus for transmitting said television and audio signals to a point remote from said transmitter; a first coding-signal source for supplying a first coding signal to said coding means to code said one signal in accordance with a certain coding schedule determined by a characteristic of said first coding signal; apparatus disposed between said first coding-signal source and said coding means and responsive to an applied signal for altering said characteristic of said first coding signal as applied to said coding means thereby to vary said coding schedule; a key signal source coupled to said last-mentioned apparatus for producing a key signal to effect said alteration in said characteristic of said first coding signal during spaced time intervals determined by said key signal; means coupled to said first coding-signal source for transmitting a first decoding signal over one channel; and means coupled to said key-signal source for transmitting said key signal over another channel.

8. A subscription television transmitter system comprising: apparatus for producing a television signal representing image intelligence to be transmitted by said system and for producing an audio signal representing sound intelligence to be transmitted by said system; coding means coupled to said apparatus for coding said television signal in response to an applied coding signal; means coupled to said apparatus for transmitting said coded television signal and said audio signal to a point remote from said transmitter; a first coding-signal source coupled to said coding means for producing a first coding signal to effect said coding of said television signal in accordance with a certain coding schedule determined by a characteristic of said first coding signal; means for applying said first coding signal to said transmitting means for transmission to said remote point concurrently with the transmission of said television and audio signals; apparatus disposed between said first coding-signal source and said coding means and responsive to an applied signal for altering said characteristic of said first coding signal as applied to said coding means thereby to vary said coding schedule; a key-signal source coupled to said last-mentioned apparatus for producing a key signal to effect said alteration in said characteristic of said first coding signal during spaced time intervals determined by said key signal; and means coupled to said key-signal source for transmitting said key signal separately from said coded signals and said first coding signal to said remote point.

9. A subscription television transmitter system comprising: apparatus for producing a television signal representing image intelligence to be transmitted by said system; coding means coupled to said apparatus for coding said television signal in response to an applied coding signal; means coupled to said apparatus for transmitting said coded television signal to a point remote from said transmitter; apparatus for producing an audio signal representing sound intelligence to be transmitted by said system; means coupled to said audio signal producing apparatus for transmitting said audio signal to said remote point; a coding-signal source coupled to said coding means for producing a coding signal to effect said coding of said television signal in accordance with a certain coding schedule determined by a characteristic of said coding signal; means for applying said coding signal to said audio-signal transmitting means for transmission to said remote point combined with said audio signal; apparatus disposed between said source and said coding means and responsive to an applied signal for altering said characteristic of said coding signal as applied to said coding means thereby to vary said coding schedule; and a key-signal source coupled to said last mentioned apparatus for producing a key signal to effect said alteration in said characteristic of said coding signal during spaced time intervals.

10. A subscription television transmitter system comprising: apparatus for producing a television signal representing image intelligence to be transmitted by said system; coding means coupled to said apparatus for coding said television signal in response to an applied coding signal; means coupled to said apparatus for transmitting said coded television signal to a point remote from said transmitter; apparatus for producing an audio signal representing sound intelligence to be transmitted by said system; means coupled to said audio signal producing apparatus for transmitting said audio signal to said remote point; a coding-signal generator coupled to said coding means for producing a coding signal to effect said coding of said television signal in accordance with a certain coding schedule determined by said coding signal; means for applying said coding signal to said audio-signal transmitting means for transmission to said remote point combined with said audio signal; a phase inverter disposed between said generator and said coding means and actuated by an applied signal for inverting the phase of said coding signal as applied to said coding means thereby to vary said coding schedule; and a key-signal generator coupled to said phase inverter for producing a key signal to actuate said inverter during spaced time intervals.

11. A subscription television transmitter system comprising: a picture-converting device; a scanning system for controlling said device to develop during recurrent trace intervals a video-frequency signal representing a scanned subject and including a synchronizing-signal generator for developing during interposed retrace intervals a synchronizing signal representing a timing characteristic of said device; means, including a mixer amplifier coupled to said converting device and to said scanning system for developing a composite television signal including in alternation video-frequency components and synchronizing-signal components; coding means included in said scanning system for varying the time relation between said video-frequency and synchronizing-signal components in response to an applied coding signal; means coupled to said mixer amplifier for transmitting said television signal to a point remote from said transmitter; a coding-signal generator for supplying to said coding means a coding signal to vary said time relation in accordance with a predetermined schedule determined by a characteristic of said coding signal; apparatus disposed between said coding-signal generator and said coding means and actuated by an applied signal for altering said characteristic of said coding signal as applied to said coding means thereby to vary said schedule; and a key-signal generator controlled by said synchronizing-signal generator and coupled to said last mentioned apparatus for developing a key signal to actuate said last mentioned apparatus during spaced time intervals.

12. A subscription television transmitter system comprising: a picture-converting device; a scanning system for controlling said device to develop during recurrent trace intervals a video-frequency signal representing a scanned subject and including a synchronizing-signal generator for developing during interposed retrace intervals a synchronizing signal representing a timing characteristic of said device; means including a mixer amplifier coupled to said converting device and to said scanning system for developing a composite television signal including in alternation video-frequency components and synchronizing-signal components; coding means included in said scanning system for varying the time relation between said video-frequency and synchronizing-signal components in response to an applied coding signal; means coupled to said mixer amplifier for transmitting said television signal to a point remote from said transmitter; a coding-signal generator for supplying to said coding means a coding signal to vary said time relation in accordance with a predetermined schedule determined by a characteristic of said coding signal; apparatus disposed between said coding-signal generator and said coding means capable of being actuated to alter said characteristic of said coding signal as applied to said coding means thereby to vary said schedule; a key-signal generator controlled by said synchronizing-signal generator for developing a key signal for transmission to said remote point over a private link; and an operator circuit coupled to said last-mentioned apparatus and responsive to the joint application of said synchronizing signal and said key signal for actuating said last-mentioned apparatus during spaced time intervals.

13. A subscription television transmitter system comprising: a picture-converting device; a scanning system for controlling said device to develop during recurrent trace intervals a video-frequency signal representing a scanned subject and including a synchronizing-signal generator for developing during interposed retrace intervals a synchronizing signal representing a timing characteristic of said device; means including a mixer amplifier coupled to said converting device and to said scanning system for developing a composite television signal including in alternation video-frequency components and synchronizing-signal components; a coding circuit included in said scanning system for varying the time relation between said video-frequency and synchronizing-signal components in response to an applied coding signal; means coupled to said mixer amplifier for transmitting said television signal to a point remote from said transmitter; apparatus for producing an audio signal representing sound intelligence to be transmitted by said transmitter; means coupled to said audio signal producing apparatus for transmitting said audio signal to said remote point; a coding signal generator coupled to said coding circuit for developing a coding signal to effect said variation in said time relation in accordance with a predetermined schedule determined by said coding signal; means for applying said coding signal to said audio-signal transmitting means for transmission to said remote point combined with said audio signal; a phase inverter disposed between said coding-signal generator and said coding circuit and actuated by an applied signal for inverting the phase of said coding signal as applied to said coding circuit thereby effecting a variation in said coding schedule; and a key-signal generator controlled by said synchronizing-signal generator and coupled to said phase inverter for developing a key signal to actuate said inverter during spaced intervals; and means for transmitting said key signal to said remote point.

14. A subscription television system comprising a transmitter and a receiver; said transmitter including, apparatus for producing a television signal representing image intelligence to be transmitted to said receiver, coding means coupled to said apparatus for coding said television signal in response to an applied coding signal, means coupled to said apparatus for transmitting said coded television signal to said receiver, apparatus for producing an audio signal representing sound intelligence to be transmitted to said receiver, means coupled to said audio signal producing apparatus for transmitting said audio signal to said receiver, a coding-signal source coupled to said coding means for producing a coding signal to effect said coding of said television signal in accordance with a certain coding schedule determined by a characteristic of said coding signal, means for applying said coding signal to said audio-signal transmitting means for transmission to said receiver combined with said audio signal, apparatus disposed between said source and said coding means and responsive to an applied signal for altering said characteristic of said coding signal as applied to said coding means thereby to vary said coding schedule, a key-signal source coupled to said last-mentioned apparatus for producing a key signal to effect said alteration in said characteristic of said coding signal during spaced time intervals, and a line circuit coupled to said key-signal source and extending to said receiver for supplying said key signal to said receiver; and said receiver including, an image-reproducing device and a sound-reproducing device, television apparatus for supplying said television signal to said image-reproducing device, audio apparatus for supplying said audio signal to said sound-reproducing device, decoding means coupled to said television apparatus for decoding said television signal in response to an applied signal, a filter circuit coupled to said audio apparatus for removing said coding signal from said audio signal and for supplying said coding signal to said decoding means, and apparatus disposed between said filter circuit and said decoding means and responsive to said key signal for altering said characteristic of said coding signal as applied to said decoding means in correspondence with the alterations of said characteristic at said transmitter to cause said image-reproducing device to reproduce the image intelligence contained in said coded television signal.

15. A subscription television transmitter comprising: apparatus for producing a television signal representing picture intelligence to be transmitted; coding means for coding said television signal in response to an applied signal; one source for developing a first coding signal representing a coding schedule; another source for developing a second coding signal representing a coding schedule; apparatus coupled to said sources to receive said first and second coding signals and to produce in response thereto a third coding signal representing a coding schedule different from the coding schedules represented by said first and second coding signals; means for coupling said apparatus to said coding means; means coupled to said first coding-signal source for transmitting a first decoding signal over a first channel; and means coupled to said second coding-signal source for transmitting a second decoding signal over another channel.

16. A subscription television transmitter comprising: apparatus for producing a television signal representing picture intelligence to be transmitted; coding means for coding said television signal in response to an applied signal; one source for developing a first coding signal representing a coding schedule; another source for developing a second coding signal representing a distinctly different coding schedule; apparatus coupled to said sources to receive said first and second coding signals and to produce in response thereto a third coding signal representing a coding schedule different from the coding schedules represented by said first and second coding signals; means for coupling said apparatus to said coding means; means coupled to said first coding-signal source for transmitting a first decoding signal over a first channel; and means coupled to said second coding-signal source for transmitting a second decoding signal over another channel.

17. A subscription television transmitter comprising: apparatus for producing a television signal representing in a series of scanning fields recurring at a selected rate picture intelligence to be transmitted; coding means for varying the mode of transmission of said television signal effectively to code said television signal; a control system for supplying an actuating signal to said coding means effectively to actuate said coding means at a rate faster than the aforesaid selected recurrence rate of said scanning fields; and means coupled to said control system for varying said actuating signal and the actuation of said coding means at a rate slower than said selected recurrence rate of said scanning fields.

RICHARD O. GRAY.
ERWIN M. ROSCHKE.

References Cited in the file of this patent

UNITED STATES PATENTS

| Number | Name | Date |
|---|---|---|
| 1,310,719 | Vernam | July 22, 1919 |
| 1,356,546 | Morehouse | Oct. 26, 1920 |
| 2,237,533 | Spencer | Apr. 18, 1941 |
| 2,251,525 | Rosenthal | Aug. 5, 1941 |
| 2,402,067 | Mathes | June 11, 1946 |
| 2,403,059 | Dillenbeck | July 2, 1946 |
| 2,403,540 | Meneley | July 9, 1946 |
| 2,405,252 | Goldsmith | Aug. 6, 1946 |
| 2,414,101 | Hogan | Jan. 14, 1947 |
| 2,472,774 | Mayle | June 7, 1949 |
| 2,510,046 | Ellett et al. | May 30, 1950 |

FOREIGN PATENTS

| Number | Country | Date |
|---|---|---|
| 386,849 | Great Britain | Jan. 26, 1933 |